(12) United States Patent
Tamura et al.

(10) Patent No.: US 9,017,820 B2
(45) Date of Patent: Apr. 28, 2015

(54) LAMINATED GLASS LENS FOR SPECTACLES

(75) Inventors: Kanichi Tamura, Osaka (JP); Shoichi Mitsuuchi, Kanan (JP); Kenzo Wada, Kashiwara (JP)

(73) Assignee: Talex Optical Co., Ltd., Osaka (JP)

( * ) Notice: Subject to any disclaimer, the term of this patent is extended or adjusted under 35 U.S.C. 154(b) by 382 days.

(21) Appl. No.: 13/522,980

(22) PCT Filed: Feb. 9, 2011

(86) PCT No.: PCT/JP2011/052698
§ 371 (c)(1),
(2), (4) Date: Jul. 19, 2012

(87) PCT Pub. No.: WO2011/105211
PCT Pub. Date: Sep. 1, 2011

(65) Prior Publication Data
US 2012/0287395 A1    Nov. 15, 2012

(30) Foreign Application Priority Data
Feb. 25, 2010  (JP) ................................ 2010-040457

(51) Int. Cl.
*B32B 27/40* (2006.01)
*B29C 65/00* (2006.01)
*G02C 5/00* (2006.01)
*G02C 7/10* (2006.01)
*G02C 9/00* (2006.01)
*G02B 5/22* (2006.01)
*C03C 27/10* (2006.01)
*C09B 47/00* (2006.01)
*G02C 7/02* (2006.01)
*G02C 7/12* (2006.01)
*B32B 17/10* (2006.01)

(52) U.S. Cl.
CPC ................ *G02B 5/223* (2013.01); *C03C 27/10* (2013.01); *C09B 47/00* (2013.01); *G02C 7/022* (2013.01); *G02C 7/10* (2013.01); *G02C 7/12* (2013.01); *B32B 17/10036* (2013.01); *B32B 17/10458* (2013.01); *B32B 17/10651* (2013.01); *B32B 17/10706* (2013.01); *G02C 2202/16* (2013.01); *G02C 7/108* (2013.01)

(58) Field of Classification Search
None
See application file for complete search history.

(56) References Cited

U.S. PATENT DOCUMENTS

| 5,759,448 A | 6/1998 | Katono et al. |
| 7,506,977 B1 * | 3/2009 | Aiiso ........................ 351/159.63 |
| 2002/0044352 A1 | 4/2002 | Yamamoto et al. |
| 2004/0174493 A1 | 9/2004 | Chen |
| 2009/0305049 A1 | 12/2009 | Kobuchi et al. |
| 2010/0236689 A1 | 9/2010 | Amano et al. |
| 2013/0155507 A1 * | 6/2013 | Ryu et al. .................. 359/487.02 |

FOREIGN PATENT DOCUMENTS

| JP | 9-188796 | 7/1997 |
| JP | 2002-090529 | 3/2002 |
| JP | 2003-105218 | 4/2003 |
| JP | 2004-111011 | 4/2004 |
| JP | 2004-279512 | 10/2004 |
| JP | 2007-293030 | 11/2007 |
| JP | 2008-134618 | 6/2008 |
| JP | 2009-059917 | 3/2009 |
| JP | 2009-162836 | 7/2009 |
| JP | 2009-294445 | 12/2009 |
| JP | 2010-018773 | 1/2010 |
| JP | 2010-039454 | 2/2010 |
| WO | 2009/031406 | 3/2009 |

OTHER PUBLICATIONS

Japanese Office Action (Notice of Reason for Rejection), issued Jan. 14, 2014 in a Japanese application that is a foreign counterpart to the present application (with English translation).
International Search Report issued Mar. 8, 2011 in International (PCT) Application No. PCT/JP2011/052698.

* cited by examiner

*Primary Examiner* — Sheeba Ahmed
(74) *Attorney, Agent, or Firm* — Wenderoth, Lind & Ponack, L.L.P.

(57) ABSTRACT

In a laminated glass lens for spectacles, first and second glass lens substrates (each about 1 mm thick) are bonded together with an adhesive agent layer therebetween. A liquid substance of a solventless adhesive to which a pigment containing a tetraazaporphyrin compound is added together with an organic solvent is dropped onto the first glass lens substrate in the form of a droplet, and the second glass lens substrate is pressed against the first glass lens substrate with a relatively light load to spread the droplet into a layer having a thickness of 5 to 150 micrometers, and allowing the thus spread layer to be cured as the adhesive layer.

7 Claims, 2 Drawing Sheets

LAMINATED GLASS LENS FOR SPECTACLES

TECHNICAL FIELD

This invention relates to a laminated glass lens for spectacles capable of absorbing light having wavelengths in a predetermined range, and a method of producing such a lens.

BACKGROUND ART

It is generally known that by adding an inorganic or organic pigment capable of absorbing light having wavelengths in a specific range to a glass lens for spectacles, it is possible to improve anti-glare properties and visibility of the lens.

Sunglasses are used to adjust the transmittance of the sunlight, which includes light rays harmful to the eyes and can cause glare to the eyes. In order to reduce glare, it is important to reduce the transmittance of light having wavelengths near the center wavelength of the standard relative luminosity curve.

Ordinary sunglasses typically reduce transmittance over the entire wavelength range, and thus tend to extremely darken the field of view where the ambient light is scarce such as in twilight to such an extent that the wearer can hardly recognize surrounding objects (such as traffic signals and fishing floats). In other words, these sunglasses reduce entire light transmittance too much due to the effort to reduce glare and do not enable the wearer to adequately recognize subjects.

Sunglasses which can reduce transmittance of wavelengths near the center wavelength of the standard relative luminosity curve while maintaining overall brightness include those containing neodymium in the glass lenses which serves to absorb light having wavelengths near 580 nm.

Inorganic pigments that can block visible light having wavelengths near 585 nm when added in glass spectacle lenses include neodymium pigment compounds, which supply neodymium ions. Specific neodymium pigment compounds include anhydrides and hydrates of e.g. neodymium acetate, neodymium chloride, neodymium nitrate, neodymium oxide, neodymium-2,4-pentanedionate, neodymium trifluoropentanedionate, neodymium fluoride, and neodymium sulfate (JP Patent Publication 9-188796A (see e.g. paragraph 0012)).

Organic pigments which can, as with the neodymium pigment compounds, block visible light having wavelengths near 585 nm include a tetraazaporphyrin compound. This compound was added by 0.0002 to 0.05% by weight to plastic lenses (JP Patent Publication 2008-134618A (see e.g. claims 4, 6 and 8, and paragraph 0069)).

Further, a glass lens is known which comprises two glass lens substrates laminated together through a polymer film layer using an adhesive containing an ultraviolet absorbent which can absorb light having wavelengths of about 400 nm or less, such as benzotriazole (BTA) (JP Patent Publication 2004-279512A).

But in the invention of JP Patent Publication 2008-134618A, in which a tetraazaporphyrin compound is added to improve anti-glare properties, the lens materials to which this compound can be added are practically limited to plastic materials, of which the melting points are relatively low, and it was impossible to directly add this compound to glass lenses, which are generally used for spectacles.

This is because a tetraazaporphyrin compound would be thermally decomposed during melt-forming of a glass material. Such a thermally decomposed tetraazaporphyrin compound cannot sufficiently block light having wavelengths near 585 nm.

Also, the inventors of the present application tried to add a tetraazaporphyrin compound to the adhesive. But they encountered many problems in adding this compound to a very thin adhesive layer formed between the two lens substrates.

In order for a tetraazaporphyrin compound to perform its inherent function of absorbing light having wavelengths in a predetermined range when this compound is added to spectacle or sunglass lenses, it is necessary to add this compound to an extremely thin adhesive layer in a sufficiently high concentration. But this was difficult because a tetraazaporphyrin compound is less likely to be dissolved into an adhesive for glass lenses.

In order to prevent the lens obtained from becoming practically useless due to color phase irregularity, it is necessary to add the tetraazaporphyrin compound to an extremely thin adhesive layer in a sufficiently high concentration in a uniformly dispersed state. But this was difficult because a tetraazaporphyrin compound is less likely to be dissolved into an adhesive for glass lenses.

SUMMARY OF THE INVENTION

An object of the present invention is to provide a laminated glass lens for spectacles which is free of the above-mentioned problems and which can sufficiently absorb and shield light having wavelengths near 585 nm, thereby improving its anti-glare properties and also preventing color shade irregularities by adding a tetraazaporphyrin compound in a required concentration to an extremely thin adhesive layer.

In order to achieve this object, the present invention provides a laminated glass lens for spectacles, comprising a plurality of glass lens substrates laminated one on another through an adhesive layer, and containing a pigment so that the lens has a main absorption peak of visible light spectral transmission at wavelengths of 565 to 605 nm, characterized in that the adhesive layer has a thickness of 5 to 150 μm and comprises a solventless adhesive to which a pigment containing a tetraazaporphyrin compound is added together with an organic solvent.

With this arrangement, it is possible to add the tetraazaporphyrin compound to the solventless adhesive in a required concentration by adding a pigment containing the tetraazaporphyrin compound to the solventless adhesive together with an organic solvent. Since the compound can be extremely uniformly dissolved or dispersed, the laminated glass lens for spectacles can sufficiently shield or absorb light having wavelengths near 585 nm.

In order for the glass lens to sufficiently absorb light in this manner and in order for the pigment to be uniformly dissolved and dispersed, the organic solvent should remain in the adhesive layer after curing by a certain amount, preferably by not more than 2% by weight, more preferably by not more than 1.2% by weight, and further preferably by 0.2 to 1.2% by weight.

The pigment preferably further comprises a neodymium pigment compound in addition to the tetraazaporphyrin compound.

By using a neodymium pigment compound, the main absorption peak of the visible light spectral transmission in the wavelength range of 565 to 605 nm further sufficiently decreases.

The adhesive layer should be 5 to 150 μm thick. If the thickness of the adhesive layer is less than 5 μm, the bond strength tends to be unstable, thus causing blurring and deteriorated outer appearance. If the adhesive layer is thicker than 150 μm, the adhesive layer tends to develop bubbles and strains.

As the laminated glass lens for polarized spectacles, the laminated glass lens according to the invention may further comprise a polarizing film layer.

The polarizing film improves anti-glare properties of the lens. The polarizing ability especially improves if the polarizing film layer comprises a polyvinyl alcohol, and iodine polarizing agent.

The laminated glass lens for spectacles according to the present invention can be produced by: dissolving a pigment containing a tetraazaporphyrin compound into an organic solvent to obtain a pigment solution; adding the pigment solution to a solventless adhesive to obtain a pigment-containing adhesive solution having a viscosity of 100 to 2000 mPa·s; applying the pigment-containing adhesive solution to a first glass lens substrate; and laminating a second glass lens substrate on the first glass lens substrate with the adhesive solution disposed therebetween such that the adhesive solution is formed into an adhesive layer having a thickness of 5 to 150 μm and bonding the first and second glass lens substrates together.

The laminated glass lens for polarized spectacles can be manufactured by: dissolving a pigment containing a tetraazaporphyrin compound into an organic solvent to obtain a pigment solution; adding the pigment solution to a solventless adhesive to obtain a pigment-containing adhesive solution having a viscosity of 100 to 2000 mPa·s; applying the pigment-containing adhesive solution to first and second glass lens substrates and/or a polarizing film; and laminating the second glass lens substrate on the first glass lens substrate with the polarizing film disposed therebetween such that the adhesive solution is formed into adhesive layers each having a thickness of 5 to 150 μm and bonding the first and second glass lens substrates together through the polarizing film.

By using the above methods, an organic solvent in which a pigment containing a tetraazaporphyrin compound is dissolved in a predetermined concentration is dissolved or uniformly dispersed in a solventless adhesive. By adjusting the viscosity of the this-adhesive solution, which contains the above pigment, to 100 to 2000 mPa·s, the pigment is uniformly dispersed in the solution.

If this viscosity is lower than the above predetermined range, it is difficult to obtain an adhesive layer having a thickness within the above-described range. If the viscosity is higher than the above predetermined range, it is difficult to laminate the glass substrates in an orderly manner and workability deteriorates extremely. By limiting the content of the organic solvent to the above trace amount, the pigment is uniformly dissolved and dispersed.

Using these conditions, when the tetraazaporphyrin compound is added to the extremely thin adhesive layer in the required concentration, the compound is extremely uniformly dissolved or dispersed.

Since the laminated glass lens according to the present invention includes an adhesive layer having a thickness of 5 to 150 μm and comprising a solventless adhesive to which a pigment containing a tetraazaporphyrin compound is added together with an organic solvent, the tetraazaporphyrin compound can be uniformly dissolved or dispersed in the extremely thin adhesive layer in a required concentration. Thus, the glass lens according to the invention can sufficiently absorb light having wavelengths near 585 nm.

By using the method of manufacturing the laminated glass lens for spectacles according to the present invention, the tetraazaporphyrin compound can be extremely uniformly dissolved or dispersed in the adhesive layer in a required concentration. A high-performance laminated glass lens for spectacles including polarized spectacles can thus be manufactured efficiently.

DETAILED DESCRIPTION OF THE INVENTION

Now the embodiments of the present invention are described with reference to the drawings.

Figure 1:
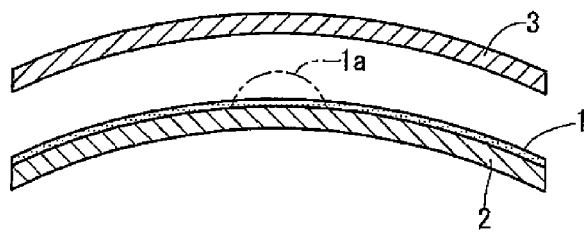
FIG. 1 is an exploded sectional view of a laminated glass lens for spectacles of a first embodiment, showing how an adhesive layer is formed.
Figure 2:
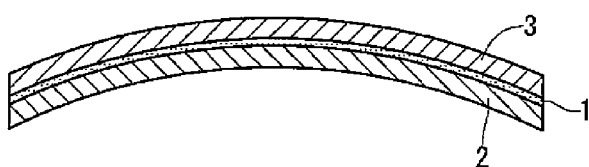
FIG. 2 is a sectional view of the laminated glass lens for spectacles of the first embodiment.

As shown in FIGS. 1 and 2, the laminated glass lens for spectacles of the first embodiment includes two glass lens substrates 2 and 3 (each about 1 mm thick) laminated one on the other through an adhesive layer 1, and contains predetermined pigments so that the lens has the main absorption peak of visible light spectral transmission at wavelengths of 565 to 605 nm, thereby achieving anti-glare properties and visibility in a balanced manner.

The adhesive layer 1 of this embodiment is formed by dropping a liquid substance comprising a solventless adhesive to which a pigment containing a tetraazaporphyrin compound is added together with an organic solvent onto the glass lens substrate 2 in the form of a droplet 1a (shown by phantom line in FIG. 1), pressing the glass lens substrate 3 against the glass lens substrate 2 with a relatively light load to spread the droplet 1a into a layer having a thickness of 5 to 150 micrometers, and allowing the thus spread layer to be cured.

The two (or more) glass lens substrates 2 and 3 used in the embodiment may be made of a known glass material such as soda glass, flint glass or crown glass. Their thicknesses are typically about 1 mm if used for the production of non-prescription spectacles such as sunglasses. If the lens of the embodiment is used for the production of prescription spectacles, a spectacle lens material having a suitable thickness of about 1 to 2 cm may be used as one of the glass lens substrates 2 and 3.

The solventless adhesive used in this invention comprises uncured monomers and oligomers of high-molecular weight compounds as major components with a curing agent added (together with a polymerization initiator, a light absorbent and other additives), and is adapted to be cured by chemical reaction such as photopolymerization with e.g. ultraviolet rays. Such solventless adhesives include UV-curing adhesives of the acrylic resin family, urethane resin adhesives, and modified silicone resin adhesives. The light absorbent may be benzotriazole (BTA), which can absorb ultraviolet rays of up to 400 nm.

The thickness of the adhesive layer can be controlled to 5 to 150 micrometers by e.g. mixing glass beads having the same refractive index as the glass substrates and having a diameter substantially equal to the target thickness of the adhesive layer, into the adhesive.

The pigment used in this invention contains, as an essential component, a tetraazaporphyrin compound, which is well known in the art and is expressed by the following chemical formula 1. A commercial version of this compound is expressed by the following chemical formula 2 and is available from Mitsui Chemicals, Inc. under the name of "PD-311S", and from Yamada Chemical Co., Ltd. under the names of "TAP-2" and "TAP-9".

[Chemical formula 1]

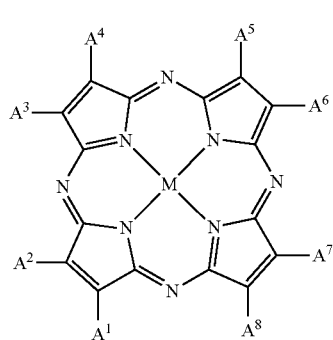

[In Chemical formula 1, A1-A8 individually indicate any of a hydrogen atom, halogen atom, nitro group, cyano group, hydroxy group, amino group, carboxyl group, sulfonic group, straight-chain, branched or cyclic alkyl group having 1 to 20 carbon atoms, alkoxy group having 1 to 20 carbon atoms, aryloxy group having 6 to 20 carbon atoms, monoalkylamino group having 1 to 20 carbon atoms, dialkylamino group having 2 to 20 carbon atoms, dialkylamino group having 7 to 20 carbon atoms, aralkyl group having 7 to 20 carbon atoms, aryl group having 6 to 20 carbon atoms, heteroaryl group, alkylthio group having 6 to 20 carbon atoms, and arylthio group having 6 to 20 carbon atoms. They may form rings other than aromatic rings through linkage group. M indicates two hydrogen atoms, a divalent metal atom, a divalent single substitution metal atom, a quadrivalent double substitution metal atom, or an oxymetal atom.]

[Chemical formula 2]

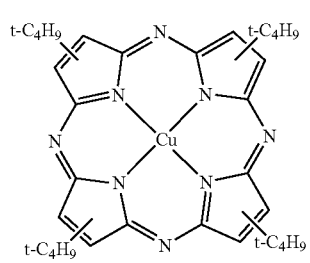

[In Chemical formula 2, Cu is divalent copper, and t-C4H9 is a tertiary butyl group and represent a positional isomer wherein the substitute positions of these four substituent groups are one of A1 and A2, one of A3 and A4, one of A5 and A6, and one of A7 and A8, respectively.

The main absorption peak of the visible light spectral transmittance (transmittance), which is present at wavelengths of 565 to 605 nm in the present invention, may be adjusted according to the performance expected for spectacle lenses. But preferably, such main absorption peak is 10% or less. By setting the main absorption peak at 10% or less, anti-glare properties and visibility improves sufficiently by including a pigment.

The organic solvent used when adding the pigment containing a tetraazaporphyrin compound to the solventless adhesive is not limited if the tetraazaporphyrin compound is soluble therein, and may be typically methyl ethyl ketone (MEK), and may also be e.g. hexane, heptane, acetone, benzene, toluene, dichloromethane or chloroform. It has been confirmed that any of these solvents, i.e. solvents of the ketone family can be used for the above purpose in the present invention.

According to the present invention, as described above, in order to uniformly dissolve and disperse the pigment, the organic solvent remains in the adhesive layer after having been cured to a certain extent, preferably by 2% by weight or less, more preferably by 1.2% by weight or less, and most preferably by 0.2 to 1.2% by weight.

If the pigment containing a tetraazaporphyrin compound is added to the solventless adhesive without adding an organic solvent at all, the pigment will be dispersed poorly and insufficiently due to secondary coagulation. If the organic solvent remains in the adhesive layer by an amount exceeding the suitable amount, the adhesive layer will not be cured sufficiently and/or it will take too long a time to be practical to cure the adhesive layer.

Pigments other than the tetraazaporphyrin compound may be used, such pigments including a neodymium pigment compound, an ultraviolet absorbing pigment and/or an infrared absorbing pigment. These pigments are typically added to the adhesive layer, but may also be added to the glass lens if this is possible, or applied to the surface of the glass lens in the form of a coating layer.

The neodymium pigment compound used in the invention may be an anhydride or a hydrate of neodymium acetate, neodymium chloride, neodymium nitrate, neodymium oxide, neodymium-2,4-pentanedionate, neodymium trifluoropentanedionate, neodymium fluoride, or neodymium sulfate, which are all known compounds.

The ultraviolet absorbing pigment used in the invention may be:
(1) 2-hydroxy-4-n-octoxybenzophenone;
(2) 4-dodecyloxy-2-hydroxybenzophenone; or
(3) 2-2'-hydroxy-4-methoxybenzophenoe.

When using any one of these ultraviolet absorbing agents, it is preferable to use one capable of absorbing all types of ultraviolet rays, including UV-A, of which the wavelengths are long (315-400 nm), UV-B, of which the wavelengths are short (280-315 nm), and UV-C, of which the wavelength are shorter than UV-B (100-280 nm).

For example, in order to erase blue flames in welding light, it is necessary to absorb rays having wavelengths of 380 to 450 nm. If a polarizing film and an infrared absorbent are used, these wavelengths can be absorbed without adding a dye. But if no polarizing film is used, a yellow dye, orange dye or red dye which absorbs blue color, or a mixture thereof is added to the resin.

In order to give the spectacle lens a brownish color tone, a yellow dye, an orange dye, a red dye or their mixture may be used. For the same purpose, the lens may not be colored during forming and the finished lens may be dyed instead.

The infrared absorbing agent used in this invention is one capable of absorbing infrared rays having wavelengths in the range of 780 to 2500 nm, and may be any known infrared absorbing pigment. The following are some preferable examples.

(1) Infrared absorbing agent selected from N,N,N',N'-tetrakis (p-substituted phenyl)-p-phenylene diamines, benzenes, and their aluminum salts and diimmonium salts;

(2) N,N,N',N'-tetraarylquinone diimmonium salts; or (3) Bis-(p-dialkylaminophenyl)[N,N-bis(p-dialkylaminophenyl)p-aminophenyl]aluminum salt If the laminated glass lens for spectacles according to the invention is a polarized lens including a polarizing film layer, a polarizing film forming the polarizing film layer can be obtained by a known method. For example, such a film is preferably formed by adding, by e.g. impregnation, iodine or an iodine compound or dye to e.g. a polyvinyl alcohol film, and uniaxially stretching the film.

Figure 3:
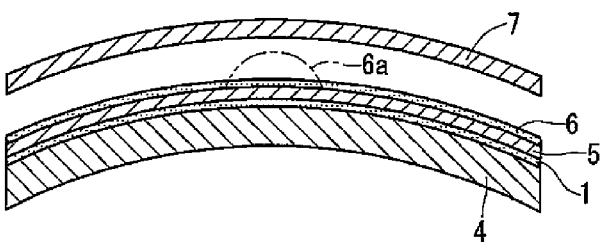
FIG. 3 is an exploded sectional view of a laminated glass lens for spectacles of a second embodiment, showing how an adhesive layer is formed.

FIG. 3 shows the second embodiment, which is a lens for polarized spectacles. The lens of this embodiment includes a glass lens substrate 4 having a thickness of 1.5 cm, an adhesive layer 1, and a polarizing film 5 laminated on the substrate 4 through the adhesive layer 1. The adhesive layer 1 is formed in the same manner as the adhesive layer 1 of the first embodiment except that the film 5 is laminated on the substrate 4 through the adhesive layer 1. The lens of the second embodiment further includes an adhesive layer 6, and a glass lens substrate 7 having a thickness of 1 mm and laminated on the polarizing film 5 through the adhesive layer 6. The adhesive layer 6 is formed by pressing the glass lens substrate 7 against the film 5 with a light load with a droplet 6a of adhesive applied on the film 5 until the layer 6 is cured.

Alternatively, the lens may be formed by insert molding, in which a chemically curable solventless adhesive is injected into spaces of e.g. 5 to 150 μm defined between the polarizing film and the lens substrate on one side of the film and between the polarizing film and the lens substrate on the other side of the film, and allowed to cure, thereby fixing the polarizing film to the lens substrates, and then grinding and/or polishing the lens according to the required strength of the lens.

The thus obtained laminated glass lens for spectacles is more resistant to pressure applied to the peripheral edge of the lens than conventional glass lenses containing neodymium, and is thus less likely to crack when the lens is fitted in a spectacle frame. This in turn prolongs the life span of the lens. The reason why the lens according to the invention has high strength is because it is formed by laminating glass substrates made of the same material, instead of glass substrates made of different materials.

EXAMPLE 1

A convex side glass substrate (8-curve lens) was prepared using soda glass having a thickness of 1 mm, and a concave side glass substrate (7.999 in curvature) was prepared. An adhesive composition was separately prepared by dissolving 1.5 grams of a tetraazaporphyrin compound (Dye PD311S, made by Mitsui Chemicals, Inc.) as the pigment expressed by Chemical formula 2 above, and 3 grams of an ultraviolet absorbing agent into 10 grams of MEK, mixing these substances into 1000 grams of an ultraviolet curing adhesive (#3201, made by Henkel Japan Ltd.), and degassing the mixture under vacuum. With the adhesive composition applied to the above respective glass substrates, the glass substrates were laminated one on the other with the polarizing films disposed therebetween, and the adhesive composition was cured by ultraviolet radiation to obtain a laminated glass lens for polarized spectacles.

A plurality of the above polarizing films (30 μm thick) were prepared by uniaxially stretching to four times polyvinyl alcohol (generally known as "vinylon") films having a thickness of 75 μm, immersing the thus stretched films in an aqueous solution of 0.1% by weight of iodine (dye solution), and then in an aqueous solution of 3% by weight of boric acid, removing the liquid content, and subjecting the films to heat treatment at 70° C. for five minutes.

Figure 4:
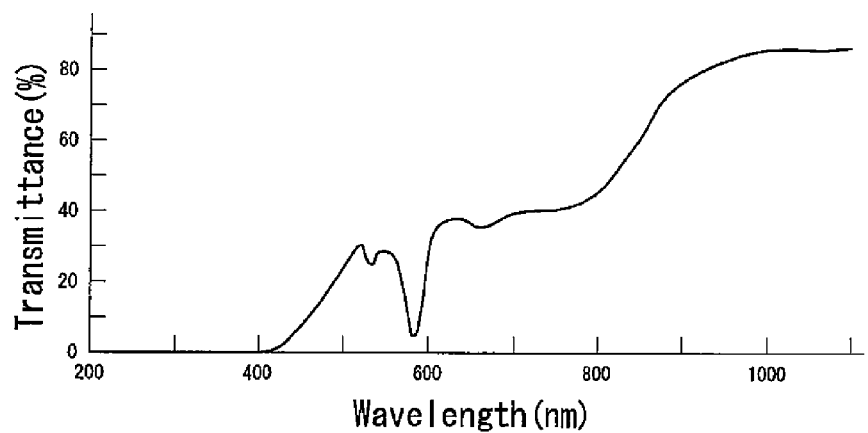
FIG. 4 is a graph showing an optical spectrum of the laminated glass lens for spectacles of Example 1 and the relationship between the wavelength and the transmittance.

The laminated glass lens for spectacles thus obtained was measured for its spectral transmittance using a spectrophotometer U-2000, made by Hitachi, Ltd. FIG. 4 shows the relationship between the wavelength and the transmittance measured.

As is apparent from FIG. 4, the capacity to absorb rays at wavelength of 580 nm was higher than a conventional glass lens containing neodymium oxide. By degassing under vacuum, the content of the organic solvent MEK in the adhesive decreased to 0.2% by weight or less. This extremely thin adhesive layer contained a tetraazaporphyrin compound by a predetermined concentration, and was still free of color phase irregularity.

EXAMPLE 2

A laminated glass lens for polarized spectacles was prepared in the same manner as in Example 1 except that 2 grams of acetone was used instead of 10 grams of MEK, and that no degassing under vacuum was performed such that the adhesive layer contains the organic solvent (acetone) by 0.2% by weight.

In Example 2 too, measurement was made in the same manner as in Example 1 using the same spectrophotometer. The relationship between the wavelengths including the wavelength of 580 nm and the transmittance was substantially the same and excellent. This extremely thin adhesive layer contained a tetraazaporphyrin compound by a predetermined concentration, and was still free of color phase irregularity.

EXAMPLE 3

A laminated glass lens for polarized spectacles was prepared in exactly the same manner as in Example 1 except that as the pigment, 0.8 grams of a tetraazaporphyrin compound (Dye PD311S, made by Mitsui Chemicals, Inc.) and 10 grams of neodymium nitrate were used instead of 1.5 grams of a tetraazaporphyrin compound (Dye PD311S, made by Mitsui Chemicals, Inc.).

In Example 3 too, measurement was made in the same manner as in Example 1 using the same spectrophotometer. The relationship between the wavelengths and the transmittance are shown in FIG. 5.

Figure 5:
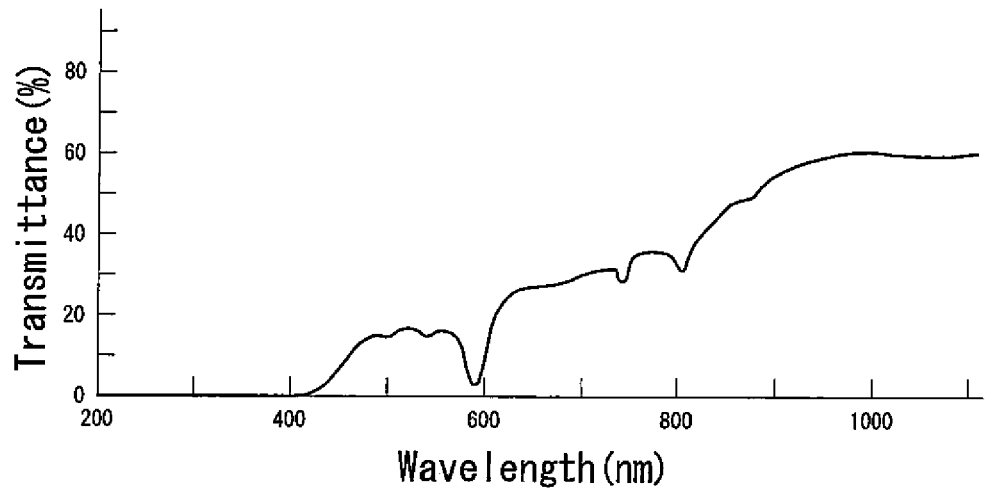
FIG. 5 is a graph showing an optical spectrum of the laminated glass lens for spectacles of Example 3 and the relationship between the wavelength and the transmittance.

As is apparent from FIG. 5, the capacity to absorb rays at wavelength of 580 nm was especially excellent, with the capacity to absorb rays peculiar to neodymium oxide added thereto. This extremely thin adhesive layer was free of color phase irregularity. Overall, the laminated glass lens for polarized spectacles obtained had excellent properties.

EXAMPLE 4

A laminated glass lens for polarized spectacles was prepared in the same manner as in Example 1 except that instead of the steps used in Example 1, i.e. the steps of "applying the adhesive composition to the respective glass substrates, laminating the glass substrates one on the other with the polarizing films disposed therebetween, and curing the adhesive composition by ultraviolet radiation, the following steps were used: steps of "retaining the two glass lens substrates so as to be spaced apart from each other by 100 μm by means of a resin gasket, injecting the same adhesive composition containing a pigment as used in Example 1, and curing the composition by ultraviolet radiation".

COMPARATIVE EXAMPLE 1

Commercially available neodymium glass was used and comprises a soda glass lens containing neodymium oxide.

Figure 6:
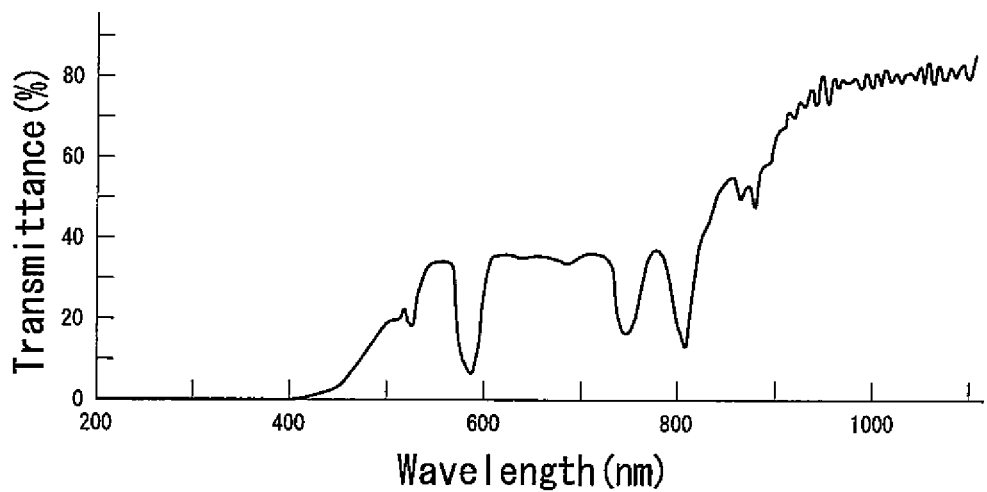
FIG. 6 is a graph showing an optical spectrum of the laminated glass lens for spectacles of Comparative Example 1 and the relationship between the wavelength and the transmittance.

The lens was measured for its spectral transmittance in the same manner as in Example 1 using the same spectrophotometer as in Example, i.e. U2000, made by Hitachi, Ltd. FIG. 6 shows the relationship between the wavelength and the thus measured transmittance.

As will be apparent from FIG. 6, the capacity of the glass containing neodymium oxide to absorb rays at wavelength of 580 nm was lower than Example 1.

COMPARATIVE EXAMPLE 2

An attempt was made to prepare a laminated glass in the same manner as in Example 1 except that instead of the adhesive used in Example 1, i.e. an ultraviolet curing adhesive (#3201, made by Henkel Japan Ltd.), which is a solventless adhesive, a commercially available vinyl acetate resin adhesive, which is a solvent adhesive, was used. But no high-quality lens was obtained.

What is claimed is:

1. A laminated glass lens for spectacles, comprising two glass lens substrates laminated one on another through an adhesive layer,
wherein the adhesive layer has a thickness of 5 to 150 μm and comprises a solventless adhesive, a pigment containing a tetraazaporphyrin compound and 0.2 to 2% by weight of an organic solvent, such that the laminated glass lens has a main absorption peak of visible light spectral transmission at wavelengths of 565 to 605 nm.

2. The laminated glass lens for spectacles of claim 1, further comprising a pigment comprising a neodymium pigment compound.

3. The laminated glass lens for spectacles of claim 1, further comprising a polarizing film layer.

4. The laminated glass lens for spectacles of claim 3, wherein the polarizing film layer comprises a polyvinyl alcohol, and iodine polarizing agent.

5. A method of producing a laminated glass lens for spectacles comprising dissolving a pigment containing a tetraazaporphyrin compound into an organic solvent to obtain a pigment solution, adding the pigment solution to a solventless adhesive to obtain a pigment-containing adhesive solution having a viscosity of 100 to 2000 mPa·s, applying the pigment-containing adhesive solution to a first glass lens substrate, and laminating a second glass lens substrate on the first glass lens substrate with the adhesive solution disposed therebetween such that the adhesive solution is formed into an adhesive layer having a thickness of 5 to 150 μm and bonding the first and second glass lens substrates together.

6. A method of producing a laminated glass lens for spectacles comprising dissolving a pigment containing a tetraazaporphyrin compound into an organic solvent to obtain a pigment solution, adding the pigment solution to a solventless adhesive to obtain a pigment-containing adhesive solution having a viscosity of 100 to 2000 mPa·s, applying the pigment-containing adhesive solution to first and second glass lens substrate and/or a polarizing film, and laminating the second glass lens substrate on the first glass lens substrate with the polarizing film disposed therebetween such that the adhesive solution is formed into adhesive layers each having a thickness of 5 to 150 μm and bonding the first and second glass lens substrates together through the polarizing film.

7. The laminated glass lens for spectacles of claim 2, further comprising a polarizing film layer.

* * * * *